United States Patent [19]

McCarty et al.

[11] Patent Number: 4,560,470

[45] Date of Patent: Dec. 24, 1985

[54] HYDRODESULFURIZATION CATALYSIS BY CHEVREL PHASE COMPOUNDS

[75] Inventors: Kevin F. McCarty, Livermore, Calif.; Glenn L. Schrader, Ames, Iowa

[73] Assignee: The United States of America as represented by the United States Department of Energy, Washington, D.C.

[21] Appl. No.: 736,154

[22] Filed: May 20, 1985

[51] Int. Cl.$^4$ ................... C10G 45/04; C10G 45/08
[52] U.S. Cl. ........................... 208/215; 208/216 R; 502/220; 502/221
[58] Field of Search ............... 208/215, 216 R; 502/220, 221

[56] References Cited

U.S. PATENT DOCUMENTS

| | | | |
|---|---|---|---|
| 4,368,115 | 1/1983 | Chianelli et al. | 208/215 |
| 4,430,442 | 2/1984 | Sawyer et al. | 502/220 |
| 4,510,260 | 4/1985 | Stiefel et al. | 502/219 |
| 4,514,517 | 4/1985 | Ho et al. | 502/220 |
| 4,540,482 | 9/1985 | Seiver et al. | 208/215 |

OTHER PUBLICATIONS

McCarty et al., HDS by Reduced Molybdenum Sulfide Catalysts, presented at IEC Meeting, Washington, DC, 9/1983.
McCarty et al., Reduced Mo States in HDS, 8th Int. Congress on Cat., W. Berlin, Ger., 7/1984.
McCarty et al., HDS by Reduced Moly Sulfides, AIChE Annual Meeting, 10/1984.

Primary Examiner—John Doll
Assistant Examiner—O. Chaudhuri
Attorney, Agent, or Firm—Hugh W. Glenn; Robert J. Fisher; Judson R. Hightower

[57] ABSTRACT

A process is disclosed for the hydrodesulfurization of sulfur-containing hydrocarbon fuel with reduced ternary molybdenum sulfides, known as Chevrel phase compounds. Chevrel phase compounds of the general composition $M_xMo_6S_8$, with M being Ho, Pb, Sn, Ag, In, Cu, Fe, Ni, or Co, were found to have hydrodesulfurization activities comparable to model unpromoted and cobalt-promoted $MoS_2$ catalysts. The most active catalysts were the "large" cation compounds (Ho, Pb, Sn), and the least active catalysts were the "small" cation compounds (Cu, Fe, Ni, Co.).

17 Claims, 3 Drawing Figures

HYDRODESULFURIZATION CATALYSIS BY CHEVREL PHASE COMPOUNDS

CONTRACTUAL ORIGIN OF THE INVENTION

The United States Government has rights in this invention pursuant to Contract No. W-7405-ENG-82 between the U.S. Department of Energy and Ames Laboratory.

BACKGROUND OF THE INVENTION

Catalytic hydrodesulfurization is most typically performed using catalysts which initially consist of molybdenum ($Mo^{+6}$) oxides dispersed on an alumina support. Catalytic activity is enhanced by addition of promoter elements, such as cobalt or nickel. The presence of a $MoS_2(Mo^{+4})$ phase in the reduced and sulfided catalysts has been established by a variety of techniques, such as x-ray diffraction, laser Raman spectroscopy, EXAFS, see Parham, T. G. et al., *J. Catal.* 85, 295 (1984), and x-ray photoelectron spectroscopy. A catalytically active Co-Mo-S (or Ni-Mo-S) phase has also been identified for supported $Co(Ni)Mo/Al_2O_3$ catalysts and unsupported $MoS_2$ catalysts. This phase is thought to consist of cobalt (or nickel) atoms situated at the edges of $MoS_2$ crystallites.

However, the complexity of the typical industrial supported $Co(Ni)Mo/Al_2O_3$ materials and even unsupported $MoS_2$-based catalysts have made characterization of the catalytically important material difficult. In addition, the extent to which the molybdenum chemistry can be altered is limited because of the predominance of $MoS_2$ for these catalysts.

Chevrel phase compounds are ternary molybdenum chalcogenides having a general formula $M_xMo_6Z_8$, with Z being sulfur, selenium, or tellurium and with M being a metallic ternary component, see Chevrel et al. "Topics in Current Physics" (O. Fisher and Maple Eds.), Vol. 34, p. 25. Springer, Berlin, 1982 also Vol. 34, p. 87. These materials have been found to be active for thiophene desulfurization at 400° C. under steady state conditions. Their hydrogenation activity for 1-butene is relatively low, however, compared to conventional cobalt molybdate catalysts. The discovery of the activity and selectivity of the Chevrel phases is important to catalytic hydrodesulfurization and doubly important since it has been found that Chevrel phase compounds have lower hydrogenation activities than comparable $MoS_2$ catalysts.

Chevrel phase catalysts are structurally very different from conventional $MoS_2$-based catalysts. The anisotropic layer structure of $MoS_2$ involves trigonal prismatic coordination of the molybdenum atoms by six sulfur atoms; bonding is strong within layers, while only weak interactions exist between the layers. In contrast, the Chevrel phases exhibit a much different molybdenum structural chemistry. As metal-rich materials, the Chevrel phases are psuedomolecular compounds based on a $Mo_6S_8$ cluster. These $Mo_6S_8$ units exist as distorted molybdenum octahedra having apexes which lie slightly outside the face centers of a distorted cube of sulfur atoms; the $Mo_6S_8$ clusters are interconnected by Mo-S and Mo-Mo bonds.

Nearly forty metals can function as the ternary component for the Chevrel phases. The $MoS_2$ layer structure only permits intercalation of some alkali and alkaline earth elements. The location of catalytically important transition metals such as cobalt and nickel in catalysts based on $MoS_2$ is still uncertain. For the Chevrel phases, the location of the ternary metal "promoter" is much less ambiguous. The arrangement of $Mo_6S_8$ clusters in the lattice gives rise to infinite channels running parallel to the rhombohedral axis, and the ternary component atoms are located at specific crystallographic sites in these channels. The structure allows the accommodation of ternary component cations of "large" size (e.g. Ho, Pb, and Sn), "intermediate" size (e.g. Ag and In), and "small" size (e.g. Cu, Fe, Ni, Co).

One of the most important aspects of molybdenum catalyst chemistry is the molybdenum oxidation state. For conventional hydrodesulfurization catalysts, the dominant oxidation state is +4 due to the present of $MoS_2$. In contrast, the Chevrel phase materials have formed oxidation states between +2 and +2⅔, depending on the concentration and/or valence of the ternary component.

SUMMARY OF THE INVENTION

It is a general object of the invention to provide a hydrodesulfurization process for a sulfur-containing gaseous hydrocarbon fuel using Chevrel phase compounds.

Another object of the invention is to provide a hydrodesulfurization process comprising, contacting a sulfur-containing gaseous hydrocarbon with a chevrel phase compound of the general formula: $M_xMo_6S_8$, at a concentration and for a time sufficient to selectively reduce the sulfur content of the hydrocarbon, wherein M is selected from large and intermediate cations for chevrel phase compounds and M and x are selected to maintain the oxidation state of most of the Mo to less than +4.

Another object of the invention is to provide a hydrodesulfurization process comprising, contacting a sulfur-containing gaseous hydrocarbon in the presence of hydrogen with a chevrel phase compound of the general formula: $M_xMo_6Z_8$, at an elevated temperature for a time sufficient to reduce the sulfur content of the hydrocarbon while maintaining hydrogenation reactions at a relatively low level, wherein M is selected from large and intermediate cations for Chevrel phase compounds and Z is selected from the group consisting of sulfur, selenium and tellurium.

BRIEF DESCRIPTION OF THE DRAWINGS

used SnMo$_6$S$_8$, (g) fresh AgMo$_6$S$_8$, (h) used AgMo$_6$S$_8$, (i) fresh InMo$_6$S$_8$, (j) used InMo$_6$S$_8$, (k) fresh Cu$_{3.2}$Mo$_6$S$_8$, (l) used Cu$_{3.2}$Mo$_6$S$_8$, (m) fresh Fe$_{1.5}$Mo$_6$S$_8$, (n) used Fe$_{1.5}$Mo$_6$S$_8$, (o) fresh Ni$_{1.6}$Mo$_6$S$_8$, (p) used Ni$_{1.6}$Mo$_6$S$_8$, (q) fresh Co$_{1.6}$Mo$_6$S$_8$, (r) used Co$_{1.6}$Mo$_6$S$_8$, (s) fresh Co$_{1.7}$Mo$_6$S$_8$, (t) used Co$_{1.7}$Mo$_6$S$_8$.

DESCRIPTION OF THE PREFERRED EMBODIMENT

The Chevrel phase catalysts were prepared from mixtures of: Mo$_{2.06}$S$_3$; powdered molybdenum metal which was reduced at 1000° C. in hydrogen for 18 hours; and sulfides of the ternary component which were made by direct combination of the elements in evacuated, fused-silica tubes. The powders were thoroughly ground together, pressed into pellets, and heated in sealed, fused-silica tubes for 24 to 48 hours at temperatures between 1000° C. and 1200° C. before quenching in air. The PbMo$_6$S$_8$, SnMo$_6$S$_8$, AgMo$_6$S$_8$, and InMo$_6$S$_8$ materials were then ground in air, pressed into pellets, and reheated at temperatures between 1100° C. and 1200° C. for 12 hours. After the final heating, all synthesis tubes were opened in a nitrogen dry box, and the Chevrel phase pellets were lightly crushed. The 40-100 mesh portion was separated for use in activity measurements.

For the PbMo$_6$S$_8$, SnMo$_6$S$_8$, AgMo$_6$S$_8$, and InMo$_6$S$_8$ materials all manipulations of the catalysts were performed in the dry box; other materials were stored in a desiccator in air for several days before the activity measurements were performed.

All compositions listed herein were nominal except for the holmium, lead, tin, silver, and indium compounds which were prepared at compositions of Ho$_{1.2}$Mo$_6$S$_8$, PbMo$_{6.2}$S$_8$, SnMo$_{6.2}$S$_8$, AgMo$_{6.2}$S$_8$, and InMo$_{6.2}$S$_8$. Even though single crystal structure refinements have indicated that the ideal M$_{1.0}$Mo$_6$S$_8$ stoichiometry exists for the large cation compounds, it is often necessary to adjust the stoichiometry to obtain homogeneous, pure polycrystalline materials.

Representative unpromoted and cobalt-promoted MoS$_2$ catalysts were also prepared. Ammonium thiomolybdate was decomposed at 1000° C. in a stream of helium, resulting in an unpromoted MoS$_2$ catalyst referred to as 1000° C. MoS$_2$. A cobalt promoted MoS$_2$ catalyst as synthesized by the homogeneous precipitation technique of Candia et al, *Bull. Soc. Chim. Belg.* 90(12), 1225 (1981). Prepared with an atomic cobalt to molybdenum ratio of one to four, the resulting material (referred to as Co$_{0.25}$—Mo$_1$—S) was pretreated at 450° C. in a 2% H$_2$S—H$_2$ mixture for four hours.

Activity measurements were performed in a ¼" diameter stainless steel reactor which could be operated in either pulsed or continuous flow mode. Product separation and analysis was performed using a n-octane/porasil C column and an Antek Model 310 gas chromatograph with a flame ionization detector. Peak areas were measured by a Hewlett Packard 3390A integrator.

High purity helium (99.997%) and hydrogen (99.997%) were further purified by passage through copper traps for removing oxygen and by passage through 4 angstrom molecular sieve traps for drying. Thiophene (Alfa Products, 99%) was subjected to several freeze-thaw cycles and was then dried over a 4 angstrom molecular sieve. Matheson 1-butene (C.P. 99.5%) was dried using a 3 angstrom molecular sieve trap.

Hydrodesulfurization activities were measured at atmospheric pressure using thiophene as a model organo-sulfur compound. Other compounds which are equally applicable to this process are Mercaptans, disulfides and condensed thiophenes, including benzyl or dibenzyl thiophene. The amount of catalyst was adjusted to give a conversion of about 3% after 20 minutes of continuous thiophene flow. The reactor was filled with fresh catalyst and was then heated from room temperature to 400° C. in a flow of helium at 19 ml/min (STP). After about 45 minutes, between ten and twenty-five ¼ ml pulses of 2 mole % thiophene in hydrogen were injected into the reactor at 30 minute intervals. The helium flow was then replaced by a continuous flow of 2 mole % thiophene in hydrogen at 22 ml/min (STP). After 10 hours of reaction, the reactor was purged and cooled in a helium stream.

Hydrogen activity measurements were performed in a pulsed flow mode to minimize potential removal of sulfur from the Chevrel phase catalysts by hydrogen at 400° C. The reactor was filled with the same amount of fresh catalyst as in the hydrodesulfurization activity measurements. The reactor contents were heated from room temperature to 400° C. in a stream of helium at 19 ml/min (STP) and held at 400° C. for about 45 minutes. The 1/10 ml pulses of 2 mole % 1-butene in hydrogen were injected into the reactor at a time spacing of 15 minutes. Twenty-five 1/10 ml pulses of 2% thiophene in hydrogen were then injected into the reactor, and the 1-butene pulses were repeated. After a continuous flow of thiophene in hydrogen for 2 hours at 22 ml/min, the reactor was purged with helium, and the 1-butene pulses were repeated.

The initial surface areas of the catalysts and the surface area after 10 hours of thiophene reaction were determined by the BET method using a Micromeritics 2100E AccuSorb instrument with krypton as the adsorbate.

X-ray powder diffraction patterns were obtained with a Siemans D500 diffractometer using copper K$\alpha$ radiation.

X-ray photoelectron spectra (XPS) were obtained with an AEI 200B spectrometer using aluminum K$\alpha$ radiation. Samples were mounted on a double sided adhesive tape, and all binding energies are referenced to a carbon 1s binding energy of 284.6 eV. Signal averaging was performed using a Nicolet 1180 computer system. In order to avoid air contamination, both the catalyst preparation tubes and the reactor were opened in a nitrogen dry box; portions of the samples were sealed in pyrex tubes which were then opened in a helium dry box attached directly to the spectrometer. Spectra of the unused catalysts were obtained either from the powder of a freshly ground chunk of sample or from a 40-100 mesh portion of material with no further grinding (for the PbMo$_6$S$_8$, SnMo$_6$S$_8$, AgMo$_6$S$_8$, and InMo$_6$S$_8$ materials). Spectra of the used catalysts were obtained from the 40-100 mesh reactor charge with no further grinding. Raw peak areas were digitally integrated with no attempt made to correct for instrumental or atomic sensitivity factors. Also, no attempt was made to remove the area due to the sulfur 2s peak from the lower binding energy side of the molybdenum 3d doublet.

Laser Raman spectra were obtained using a Spex 1403 monochromator. The 514.5 nm line of a Spectra Physics 165 argon ion laser was operated at 200 mW (as measured at the source). Data was collected using backscattering geometry with spinning catalyst pellets. A Nicolet 1180E computer data acquisition system was used to accumulate 50 scans at a scanning speed of 2 cm$^{-1}$/S with 5 cm$^{-1}$ resolution.

The continuous flow thiophene reaction results for the Chevrel phase components and for the model MoS$_2$ materials are summarized in Table 1. The activities reported reflect a more accurate determination of the flame ionization detector relative response factors. The hydrodesulfurization activities—that is, the rate of desulfurization normalized for surface area—were determined after 20 minutes and after 10 hours of reaction. For the majority of catalysts, the surface areas after 10 hours of reaction were within 10% of the surface areas of the fresh catalysts. For these materials, the activities were normalized on the basis of the initial surface areas.

However, the surface areas of Cu$_{3.2}$Mo$_3$S$_8$, Cu$_{3.8}$Mo$_6$S$_8$, and Fe$_{1.5}$Mo$_6$S$_8$ increased considerably under reaction conditions; therefore the hydrodesulfurization activities of these materials after 10 hours of reaction were normalized using the final surface areas.

The activities of the Chevrel phase catalysts are comparable to the activities of the model MoS$_2$ compounds. Indeed, after 10 hours of reaction all large cation materials show higher activities than the model MoS$_2$ catalysts. The activities of the Chevrel phase compounds can be grouped according to their structural classification, with the large cation compounds being the most active, the intermediate cation compounds being less active, and the small cation compounds being the least active. After 10 hours of thiophene reaction, the order of activity is HoMo$_6$S$_8$<PbMo$_6$S$_8$<SnMo$_6$S$_8$<AgMo$_6$S$_8$<InMo$_6$S$_8$  Cu$_x$Mo$_6$S$_8$<Ni$_{1.6}$Mo$_6$S$_8$<Fe$_{1.5}$Mo$_6$S$_8$≃Co$_x$Mo$_6$S$_8$. The most active Chevrel phase catalysts involve the unusual "promoters" Ho, Pb and Sn; in contrast, the Chevrel phase compounds incorporating Ni and Co—the two most common conventional hydrodesulfurization promoters—are among the least active catalysts.

Table 1 also provides the hydrodesulfurization activities of a series of cobalt Chevrel catalysts, Co$_x$Mo$_6$S$_8$, where x varies between 1.5 and 1.9. After 20 minutes of reaction, the activity increases in a roughly linear manner with increasing cobalt concentration. However, these differences in activity have decreased significantly after 10 hours of reaction.

The distribution of C$_4$ hydrocarbon products resulting from the desulfurization of thiophene varies considerably for the catalysts. For example, the ratio of the 2-butenes to 1-butene after 2 hours of reaction is 2.1 for HoMo$_6$S$_8$, 0.78 for PbMo$_6$S$_8$, 0.66 for SnMo$_6$S$_8$, 1.3 for AgMo$_6$S$_8$, 1.6 for InMo$_6$S$_8$, 0.73 for Cu$_{3.2}$Mo$_6$S$_8$, 0.64 for Fe$_{1.5}$Mo$_6$S$_8$, 1.7 for Ni$_{1.6}$Mo$_6$S$_8$, 1.3 for Co$_{1.8}$Mo$_6$S$_8$, 1.1 for 1000° C. MoS$_2$, and 1.7 for Co$_{0.25}$Mo$_1$-S. This ratio reveals a deviation in the butene concentration from the thermodynamic equilibrium value at 400° C. for which the concentration of 2-butenes to 1-butenes is 2.8.

Hydrogenation activities were calculated as the rate of production of n-butane from 1-butene and were normalized on the basis of the initial surface areas of the catalysts. Data are presented in Table 2. Hydrogenation activities were measured in the pulsed mode in order to minimize the potential removal of sulfur from the catalysts by the sulfur-free hydrogenation feed. The activities were measured at three different times: (A) fresh, (B) after 25 pulses of thiophene-hydrogen, and (C) after two hours of continuous flow thiophene reaction. Except for the B and C measurements for Ni$_{1.6}$Mo$_6$S$_8$, the hydrogenation activities of the Chevrel phase catalysts are much lower than the model MoS$_2$ catalysts. The hydrogenation activities of all fresh Chevrel phase catalysts are between 6 and 20 times lower than the fresh model MoS$_2$ catalysts. Excluding Ni$_{1.6}$Mo$_6$S$_8$, the hydrogenation activities of the Chevrel phase catalysts after 2 hours of thiophene reaction are still about 2 to 6 times lower than the model MoS$_2$ catalysts.

The catalysts also show a wide variation in their ability to isomerize the 1-butene-hydrogen pulses to a mixture of 1-butene, cis-butene, and trans-2-butene. For example, after 2 hours of thiophene reaction, 80% of the 1-butene pulse is unconverted by Cu$_{3.8}$Mo$_6$S$_8$; in contrast, only 26% of the 1-butene for the AgMo$_6$S$_8$ catalyst remain nonisomerized.

Figure 1:
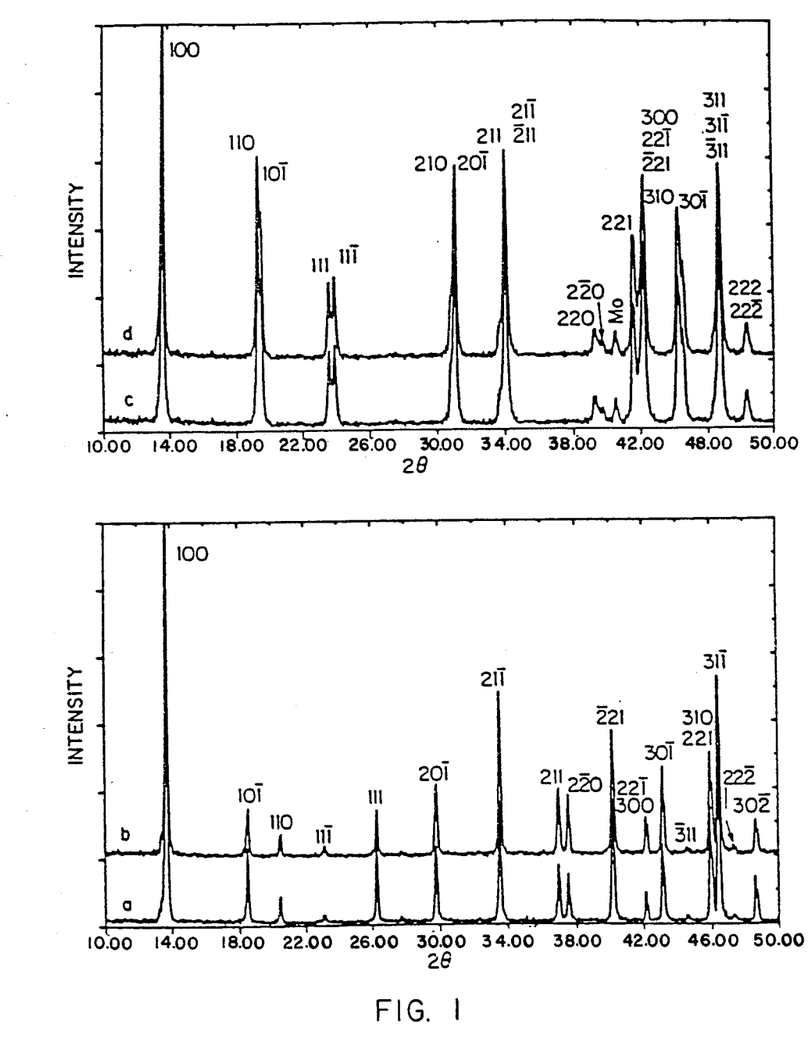
FIG. 1 compares the x-ray powder diffraction patterns of fresh and used (10 hour thiophene reaction) Chevrel phase catalysts including fresh $Co_{1.7}Mo_6S_8$, (b) used $Co_{1.7}Mo_6S_8$, (c) fresh $HoMo_6S_8$, and (d) used $HoMo_6S_8$.

FIG. 1 shows the x-ray powder diffraction patterns of two representative samples, Co$_{1.7}$Mo$_6$S$_8$ and HoMo$_6$S$_8$, before and after 10 hours of thiophene reaction. As for all the Chevrel phase compounds studied, there are no apparent changes in the x-ray patterns after reaction.

Figure 2:
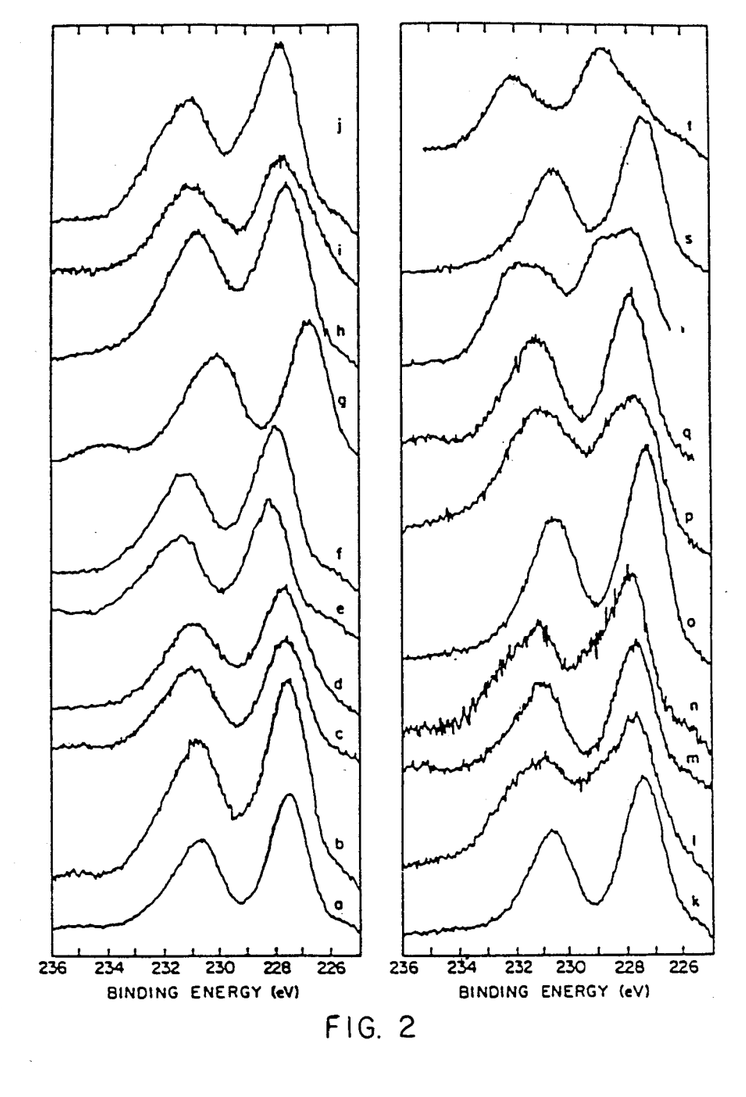
FIG. 2 shows the molybdenum 3d XPS spectra of fresh and used (10 hour thiophene reaction) Chevrel phase catalysts:
(a) fresh $HoMo_6S_8$, (b) used $HoMo_6S_8$, (c) fresh $PbMo_6S_8$, (d) used $PbMo_6S_8$, (e) fresh $SnMo_6S_8$, (f) used $SnMo_6S_8$, (g) fresh $AgMo_6S_8$, (h) used $AgMo_6S_8$, (i) fresh $InMo_6S_8$, (j) used $InMo_6S_8$, (k) fresh $Cu_{3.2}Mo_6S_8$, (l) used $Cu_{3.2}Mo_6S_8$, (m) fresh $Fe_{1.5}Mo_6S_8$, (n) used $Fe_{1.5}Mo_6S_8$, (o) fresh $Ni_{1.6}Mo_6S_8$, (p) used $Ni_{1.6}Mo_6S_8$, (q) fresh $Co_{1.6}Mo_6S_8$, (r) used $Co_{1.6}Mo_6S_8$, (s) fresh $Co_{1.7}Mo_6S_8$, (t) used $Co_{1.7}Mo_6S_8$.

The XPS binding energies of the catalysts are provided in Table 2, while FIG. 2 illustrates the molybdenum 3d doublets for the Chevrel phase catalysts in their fresh state and after 10 hours of thiophene reaction. For the fresh catalysts, the Mo 3d 5/2 binding energies are all grouped around 227.7 eV with SnMo$_6$S$_8$ being slightly higher (228.1 eV), Ni$_{1.6}$Mo$_6$S$_8$ and Co$_{1.7}$Mo$_6$S$_8$ being slightly lower (227.3 eV), and AgMo$_6$S$_8$ being considerably lower (226.6 eV). These results illustrates the low molybdenum oxidation state. For comparison, the 3d 5/2 binding energy of the Mo$^{+4}$ is MoS$_2$ is about 228.9 eV. The XPS spectra obtained for several fresh Chevrel phase catalysts which has been stored in air for several months showed very minimal—but detectable—changes from the air-isolated materials. For this reason, the PbMo$_6$S$_8$, SnMo$_6$S$_8$, AgMo$_6$S$_8$, and InMo$_6$S$_8$ materials were handled exclusively in the nitrogen-atmosphere dry box. The preparation of the holmium Chevrel phase was also repeated with the resulting materials being handled entirely in the absence of air, as were the other large and intermediate cation compounds. Excellent reproducibility in the activity measurements and in the characterization results was observed for the holmium phases regardless of the absence or presence of oxygen.

FIG. 2 shows the changes in the Mo 3d spectra which occur after 10 hours of thiophene reaction. For the large cation compounds HoMo$_6$S$_8$, PbMo$_6$S$_8$, and SnMo$_6$S$_8$, there are no apparent changes in the band positions or shapes. For the intermediate cation compound AgMo$_6$S$_8$, the Mo3d 5/2 peak shifts from 226.6 eV to 227.5 eV after reaction. For the other intermediate cation compound, InMo$_6$S$_8$, careful examination reveals the formation of shoulders on the high binding energy sides of the doublet, indicating some degree of oxidation of the surface molybdenum atoms. After thiophene reaction, the small cation materials all clearly show some degree of formation of a higher molybdenum oxidation state or states. For Cu$_{3.2}$Mo$_6$S$_8$, and Fe$_{1.5}$Mo$_6$S$_8$ the low oxidation state still dominates after reaction. However, after thiophene reaction using Co$_{1.6}$Mo$_6$S$_8$, a higher oxidation state of molybdenum with a 3d 5/2 binding energy of about 228.8 eV appears. The intensity of this band is approximately equal to that of the lower molybdenum oxidation state. For the Co$_{1.7}$Mo$_6$S$_8$ catalyst, this higher oxidation state is of greater intensity than the lower oxidation state after reaction.

The situation is less straight forward for the used $Ni_{1.6}Mo_6S_8$ molybdenum spectrum; while the 3d 5/2 peak maximum is still at the low oxidation state value of 227.8 eV, both peaks of the doublet have become broader with a corresponding reduction in the "depth" of the "valley" between the peaks.

Except for the $Co_{1.7}Mo_6D_8$ and $AgMo_6S_8$ samples, the binding energies of the ternary components change little after reaction. Similarly, for all catalysts, the sulfur 2p binding energy is unaffected by reaction (consistently around 161.7 eV).

Table 3 also provides the ratios (Mo/M) of the raw peak areas for the molybdenum 3d electrons compared to a core electron orbital level of the ternary metal M, which indicate changes in the surface compositions occurring after reaction for a particular Chevrel phase compound. For the large cation materials $PbMo_6S_8$ and $SnMo_6S_8$, the ratio Mo/M is unchanged after reaction. However, for all intermediate and small cation compounds, the ratio is larger than before, indicating a loss of ternary component atoms from the surface under reaction conditions.

Figure 3:
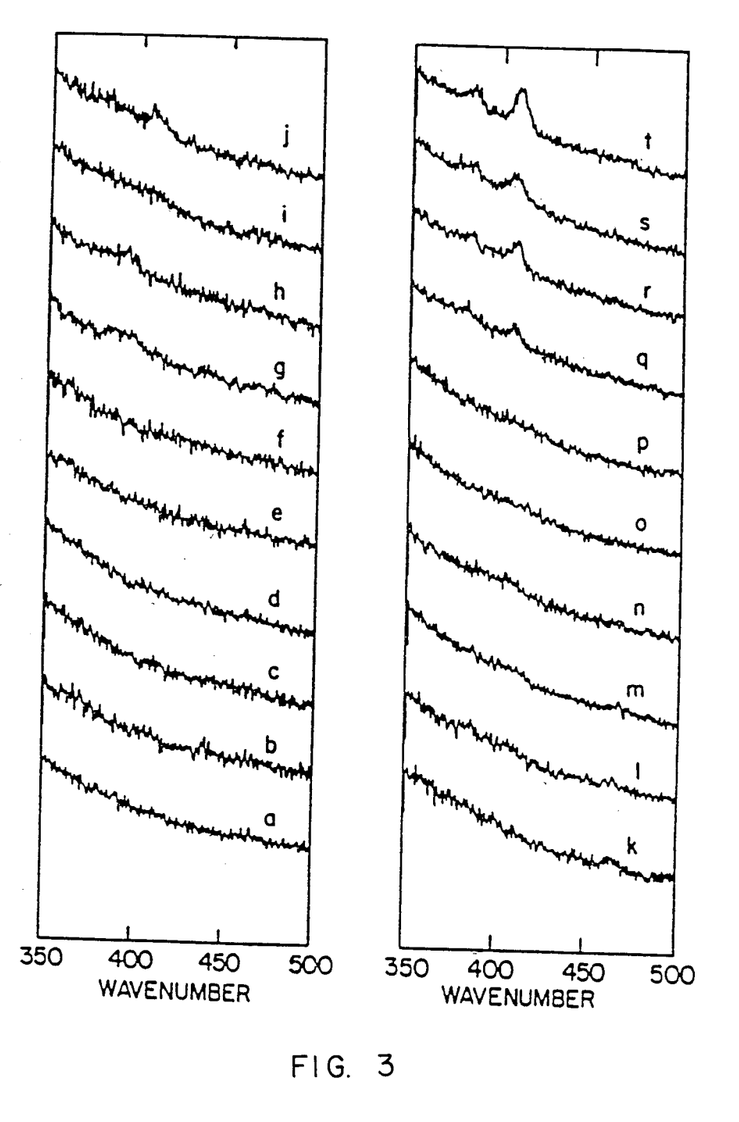
FIG. 3 shows the Raman spectra of fresh and used (10 hour thiophene reaction) Chevrel catalysts:
(a) fresh $HoMo_6S_8$, (b) used $HoMo_6S_8$, (c) fresh $PbMo_6S_8$, (d) used $PbMo_6S_8$, (e) fresh $SnMo_6S_8$, (f)

FIG. 3 provides the Raman spectra of the fresh and used (10 hours of thiophene reaction) Chevrel phase compounds in the region of the 383 and 409 $cm^{-1}$ bands of $MoS_2$. Raman spectroscopy is a very sensitive technique for the identification of both crystalline and poorly-crystalline $MoS_2$. A slight amount of $MoS_2$ impurity is indicated in the fresh $Co_{1.6}Mo_6S_8$ and $Co_{1.7}Mo_6S_8$ catalysts, as was detected for the other cobalt Chevrel phase compounds. After reaction the amount of $MoS_2$ in these materials increased. The other fresh Chevrel phase catalysts show no presence of $MoS_2$. The origin of the weak 395 $cm^{-1}$ band of $AgMo_6S_8$ is unexplained. Except for the used cobalt Chevrel phase compounds and the used $InMo_6S_8$, the Raman spectra of the used catalysts are devoid of $MoS_2$ features. The used $InMo_6S_8$ catalysts has a very weak 406 $cm^{-1}$ band, which could possibly be due to $MoS_2$ impurities.

The thiophene hydrodesulfurization activities of all Chevrel phase catalyst examined were comparable to those of the model unpromoted and cobalt-promoted $MoS_2$ catalysts (Table 1), illustrating the high desulfurization activity of these Chevrel phase catalysts.

The desulfurization activities are highest for the large cation Chevrel phase compounds, followed by the intermediate cation compounds, with the small cation compounds being the least active. The cobalt and nickel Chevrel phase catalysts are among the least active catalysts studied, even though cobalt and nickel are the most widely used promoters in conventional hydrodesulfurization catalysts. It is the incorporation of the unusual "promoters" holmium, lead, and tin in the Chevrel phase structure which results in the most active catalysts.

X-ray diffraction analysis and laser Raman spectroscopy have demonstrated the stability of the bulk structure of Chevrel phase compounds under reaction conditions. No loss of crystallinity or the formation of other phases was observed with x-ray diffraction. Except for the $Co_xMo_6S_8$ catalysts and possibly the used $InMo_6S_8$ catalyst, no crystalline or poorly crystalline $MoS_2$ impurities were observed either before or after reaction with laser Raman spectroscopy.

XPS analysis (FIG. 2) indicates that the stability of the reduced molybdenum oxidation states with respect to surface oxidation can be correlated with the structural properties of the Chevrel phase compounds. For the large cation compounds, molybdenum underwent no apparent oxidation under reaction conditions. For the intermediate cation compound $AgMo_6S_8$, an increase of nearly 1 eV in the Mo 3d 5/2 binding energy after reaction indicated molybdenum oxidation. However, the final Mo 3d 5/2 binding energy of 227.5 eV still represents a "reduced" molybdenum state which is comparable to the values found for the majority of fresh catalysts. A small degree of oxidation to $Mo^{+4}$ was apparent for the other intermediate cation compound $InMo_6S_8$. Except for $Ni_{1.6}Mo_6S_8$, all small cation compounds clearly exhibited some formation of a $Mo^{+4}$ state after reaction. This oxidation was greatest in the cobalt compounds $Co_xMo_6S_8$ for which the amount of $MoS_2$, as determined by Raman spectroscopy, was also found to increase after reaction. For $Ni_{1.6}Mo_6S_8$, the Mo 3d doublet was found to be broaden after reaction, indicating the possible formation of a distribution of surface molybdenum oxidation states.

For the small and intermediate cation compounds, oxidation of the surface molybdenum was also accompanied by a loss of the ternary component from the surface (Table 3). However, the large cation compounds $PbMo_6S_8$ and $SnMo_6S_8$ exhibit no change in the ternary component concentration at the surface as a result of thiophene reaction. For the Chevrel phase materials, the presence of the ternary component is necessary for stability. For example, the binary compound $Mo_6S_8$ cannot be formed directly from the elements; rather it can be produced only by leaching out the ternary component from a small cation compound. While ternary Chevrel phases are stable at high temperature (melting points of about 1700° C.), $Mo_6S_8$ decomposes at about 400° C. Experiments performed in our research have revealed the formation of large amounts of $MoS_2$ (established by Raman spectroscopy) for $Mo_6S_8$ after thiophene reaction at times as short as 2 hours and at temperatures as low as 300° C. Thus, the loss of ternary component from the surface of the small and intermediate cation compounds can result in a material which is unstable towards partial oxidation.

With the exception of $Ni_{1.6}Mo_6sS_8$, the low hydrogenation activities of the Chevrel phase catalysts clearly distinguish them from the model $MoS_2$ catalysts (see Table 2). The combination of the high hydrodesulfurization activity and low hydrogenation activity of the Chevrel phase materials results in high selective catalysts. For example, after 2 hours of thiophene reaction, the ratio of hydrodesulfurization to hydrogenation is 34.4 for $HoMo_6S_8$, 33.3 for $PbMo_6S_8$, 24.2 for $SnMo_6S_8$, 7.8 for $AgMo_6S_8$, 17.1 for $InMo_6S_8$, 14.2 for $Cu_{3.2}Mo_6S_8$, 20.7 for $Fe_{1.5}Mo_6S_8$, 3.2 for $Ni_{1.6}Mo_6S_8$, and 11.1 for $Co_{1.7}Mo_6S_8$; in contrast, the values for the model catalysts are 6.6 for $Co_{0.25}$—$Mo_1$—S and 2.0 for 1000° C. $MoS_2$.

Hydrogenation and hydrodesulfurization may occur at distinct sites on conventional $Co(Ni)Mo/Al_2O_3$. The isotropic nature of the Chevrel phase catalysts would, in contrast, provide only a few distinct types of geometrical sites, resulting in a high degree of catalytic selectivity. The uniform nature of the Chevrel phase compounds, with their direct incorporation of "promoter" atoms, apparently results in catalysts primarily with "promoted" molybdenum sites. The high desulfurization and low hydrogenation activity of these "promoted" sites—and the concomittant lack of "unpromoted" sites—apparently result in high desulfurization rates and low hydrogenation rates. For $Ni_{1.6}Mo_6S_8$ following reaction, very little nickel was found at the catalyst surface (see Table 3). This lack of "promoter" atoms necessitated the formation of unpromoted sites, offering an explanation for the high hydrogenation activity of $Ni_{1.6}Mo_6S_8$.

The Chevrel phase catalysts, as confirmed with XPS analysis, allow direct synthesis of reduced molybdenum states. The hydrodesulfurization activity of these catalysts is high and comparable to model conventional catalysts. Most importantly, however, is that the hydrodesulfurization activity is highest for the most stable—and thus the most reduced—Chevrel phase compounds.

While there has been provided what at present is considered to the preferred embodiment of the present invention, it will be understood that various modifications and alterations may be made therein without departing from the broadest scope of the present invention which is intended to be covered in the claims appended hereto.

TABLE 1

Thiophene hydrodesulfurization activities (400° C.).

| Catalyst | Surface Area ($m^2$/gm) | Reaction time | Thiophene Conversion (%) | HDS Rate (mol/s · $m^2$) × $10^8$ | $C_4$ product distribution | | | |
|---|---|---|---|---|---|---|---|---|
| | | | | | n-butane | 1-butene | trans-2-butene | cis-2-butene |
| Large Cation Compounds | | | | | | | | |
| $HoMo_6S_8$ | 0.579 | 20 min | 2.48 | 12.65 | 0.9 | 32.2 | 41.2 | 25.7 |
| | | 10 hr | 2.20 | 11.23 | 0.4 | 40.5 | 34.6 | 24.5 |
| $PbMo_6S_8$ | 0.400 | 20 min | 1.92 | 10.03 | 1.0 | 54.4 | 26.0 | 18.5 |
| | | 10 hr | 1.28 | 6.68 | 1.0 | 62.0 | 23.8 | 13.2 |
| $SnMo_6S_8$ | 0.388 | 20 min | 1.90 | 3.57 | 0.6 | 60.7 | 22.6 | 16.1 |
| | | 10 hr | 1.72 | 3.24 | 0.5 | 63.1 | 21.3 | 15.1 |
| Intermediate Cation Compounds | | | | | | | | |
| $AgMo_6S_8$ | 0.438 | 20 min | 2.59 | 5.12 | 1.1 | 36.5 | 39.1 | 23.3 |
| | | 10 hr | 1.19 | 2.34 | 0.8 | 44.1 | 37.7 | 17.4 |
| $InMo_6S_8$ | 0.625 | 20 min | 2.76 | 6.47 | 0.6 | 38.8 | 36.3 | 24.3 |
| | | 10 hr | 0.89 | 2.08 | —[a] | 38.5 | 43.4 | 18.1 |
| Small Cation Compounds | | | | | | | | |
| $Cu_{3.2}Mo_6S_8$ | 0.090 | 20 min | 3.08 | 5.83 | 1.3 | 57.2 | 26.5 | 15.0 |
| | 0.180 | 10 hr[b] | 1.95 | 1.84 | 0.6 | 58.9 | 28.6 | 11.9 |
| $Cu_{3.8}Mo_6S_8$ | 0.081 | 20 min | 2.26 | 4.84 | 1.0 | 59.8 | 28.7 | 10.5 |
| | 0.099 | 10 hr[b] | 1.04 | 1.82 | 1.3 | 56.9 | 33.5 | 8.3 |
| $Fe_{1.5}Mo_6S_8$ | 0.093 | 20 min | 2.21 | 4.36 | 0.5 | 59.3 | 26.4 | 13.8 |
| | 0.131 | 10 hr[b] | 0.79 | 1.10 | — | 57.2 | 33.8 | 9.0 |
| $Ni_{1.6}Mo_6S_8$ | 0.150 | 20 min | 2.00 | 4.05 | 0.9 | 35.4 | 40.1 | 23.6 |
| | | 10 hr | 0.71 | 1.44 | — | 35.0 | 46.4 | 18.6 |
| $Co_{1.5}Mo_6S_8$ | 0.150 | 20 min | 2.06 | 3.16 | 0.4 | 46.4 | 34.2 | 19.0 |
| | | 10 hr | 0.54 | 0.82 | — | 42.2 | 45.6 | 12.2 |
| $Co_{1.6}Mo_6S_8$ | 0.099 | 20 min | 1.88 | 4.12 | — | 48.0 | 33.2 | 18.8 |
| | | 10 hr | 0.47 | 1.02 | — | 44.8 | 44.6 | 10.6 |
| $Co_{1.7}Mo_6S_8$ | 0.110 | 20 min | 2.05 | 3.65 | — | 46.1 | 35.5 | 18.4 |
| | | 10 hr | 0.59 | 1.05 | — | 42.5 | 45.3 | 12.2 |
| $Co_{1.8}Mo_6S_8$ | 0.080 | 20 min | 2.49 | 5.77 | — | 44.4 | 37.2 | 18.4 |
| | | 10 hr | 0.52 | 1.20 | — | 40.1 | 48.5 | 11.4 |
| $Co_{1.9}Mo_6S_8$ | 0.079 | 20 min | 2.11 | 4.70 | 0.4 | 47.6 | 35.3 | 16.7 |
| | | 10 hr | 0.51 | 1.13 | — | 42.9 | 46.5 | 10.6 |
| Model $MoS_2$ Compounds | | | | | | | | |
| $Co_{.25}$—$Mo_1$—S | 10.83 | 20 min | 1.94 | 7.37 | 1.3 | 35.9 | 38.0 | 24.8 |
| | | 10 hr | 0.77 | 2.92 | 1.5 | 36.4 | 41.1 | 21.0 |
| 1000° C. $MoS_2$ | 3.40 | 20 min | 2.22 | 2.67 | 2.4 | 41.2 | 32.7 | 23.7 |
| | | 10 hr | 0.76 | 0.92 | 1.8 | 46.0 | 34.9 | 17.3 |

[a]below detection limit
[b]results based on surface area after reaction

TABLE 2

1-butene hydrogenation activities (400° C.).

| Catalyst | | HYD Rate (mol/s · $m^2$) × $10^8$ | $C_4$ product distribution | | | |
|---|---|---|---|---|---|---|
| | | | n-butane | 1-butene | trans-2-butene | cis-2-butene |
| Large Cation Compounds | | | | | | |
| $HoMo_6S_8$ | A | 0.40 | 0.1 | 90.5 | 4.6 | 4.8 |
| | B | 0.35 | 0.1 | 93.3 | 3.2 | 3.4 |
| | C | 0.42 | 0.1 | 31.2 | 38.6 | 30.1 |
| $PbMo_6S_8$ | A | 0.34 | 0.1 | 76.2 | 11.8 | 11.9 |
| | B | 0.32 | 0.1 | 76.5 | 11.6 | 11.8 |
| | C | 0.32 | 0.1 | 68.1 | 15.7 | 16.1 |
| $SnMo_6S_8$ | A | 0.13 | 0.1 | 47.0 | 27.9 | 25.0 |
| | B | 0.12 | 0.1 | 39.3 | 32.5 | 28.1 |
| | C | 0.15 | 0.1 | 46.6 | 27.8 | 25.5 |
| Intermediate Cation Compounds | | | | | | |
| $AgMo_6S_8$ | A | 0.18 | 0.1 | 26.0 | 41.8 | 32.1 |
| | B | 0.22 | 0.1 | 27.8 | 40.5 | 31.6 |
| | C | 0.44 | 0.3 | 26.5 | 41.8 | 31.4 |
| $InMo_6S_8$ | A | 0.38 | 0.2 | 28.8 | 39.7 | 31.3 |
| | B | 0.38 | 0.2 | 25.7 | 42.2 | 31.9 |
| | C | 0.21 | 0.1 | 28.9 | 40.1 | 30.9 |

TABLE 2-continued

| | 1-butene hydrogenation activities (400° C.) | | | | |
|---|---|---|---|---|---|
| | HYD Rate | C$_4$ product distribution | | | |
| Catalyst | (mol/s · m$^2$) × 10$^8$ | n-butane | 1-butene | trans-2-butene | cis-2-butene |
| Small Cation Compounds | | | | | |
| Cu$_{3.2}$Mo$_6$S$_8$      A | 0.18 | 0.1 | 41.5 | 31.4 | 27.0 |
| B | 0.49 | 0.3 | 49.2 | 25.8 | 24.7 |
| C | 0.36 | 0.2 | 51.2 | 23.9 | 24.7 |
| Cu$_{3.8}$Mo$_6$S$_8$      A | 0.25 | 0.1 | 53.8 | 23.2 | 22.9 |
| B | 0.41 | 0.2 | 51.8 | 24.1 | 23.9 |
| C | 0.20 | 0.1 | 80.0 | 9.5 | 10.4 |
| Fe$_{1.5}$Mo$_6$S$_8$      A | 0.14 | 0.1 | 91.7 | 4.2 | 4.0 |
| B | 0.14 | 0.1 | 82.2 | 8.6 | 9.1 |
| C | 0.14 | 0.1 | 78.8 | 10.1 | 11.0 |
| Ni$_{1.6}$Mo$_6$S$_8$      A | 0.31 | 0.2 | 22.8 | 46.9 | 30.1 |
| B | 0.98 | 0.5 | 23.7 | 44.4 | 31.4 |
| C | 0.71 | 0.4 | 26.9 | 41.5 | 31.2 |
| Co$_{1.7}$Mo$_6$S$_8$      A | 0.16 | 0.1 | 47.4 | 26.4 | 26.1 |
| B | 0.21 | 0.1 | 40.9 | 29.5 | 29.5 |
| C | 0.15 | 0.1 | 46.1 | 29.7 | 24.1 |
| Model MoS$_2$ Compounds | | | | | |
| Co$_{.25}$—Mo$_1$—S      A | 2.6 | 0.8 | 32.7 | 38.0 | 28.5 |
| B | 1.2 | 0.4 | 39.2 | 33.9 | 26.5 |
| C | 0.80 | 0.2 | 45.6 | 30.0 | 24.2 |
| 1000° C. MoS$_2$      A | 2.4 | 2.1 | 23.6 | 42.9 | 31.4 |
| B | 2.4 | 2.1 | 23.9 | 42.6 | 31.4 |
| C | 0.78 | 0.7 | 44.0 | 30.0 | 25.3 |
| Calculated butene equilibrium at 400° C.[a] | | | 26.5 | 43.5 | 30.0 |

A = fresh catalyst
B = after H$_2$ - thiophene pulses
C = after 2 hr continuous H$_2$ - thiophene reaction
[a]see reference 23

TABLE 3

| | XPS binding energies and intensity ratios. | | | | | |
|---|---|---|---|---|---|---|
| | Binding Energies (eV) | | | | | |
| Catalyst | Mo: 3d $\frac{3}{2}$ | 3d $\frac{5}{2}$ | M: — | — | S: 2p | Mo/M[a] |
| Large Cation Compounds | | | | | | |
| HoMo$_6$S$_8$      A | 230.7 | 227.5 | —[b] | — | 161.6 | — |
| B | 230.8 | 227.5 | — | — | 161.5 | — |
| PbMo$_6$S$_8$      A | 230.9 | 227.5 | 142.3[c1] | 137.5[c2] | 161.6 | 1.8[d] |
| B | 230.8 | 227.5 | 142.5 | 137.5 | 161.8 | 1.8 |
| SnMo$_6$S$_8$      A | 231.4 | 228.1 | 494.5[e1] | 486.0[e2] | 161.7 | 2.1[f] |
| B | 231.2 | 227.9 | 494.5 | 455.9 | 161.8 | 2.2 |
| Intermediate Cation Compounds | | | | | | |
| AgMo$_6$S$_8$      A | 230.0 | 226.6 | 373.9[e1] | 367.8[e2] | 161.9 | 2.6[f] |
| B | 230.7 | 227.5 | 373.1 | 367.2 | 161.7 | 8.1 |
| InMo$_6$S$_8$      A | 230.9 | 227.7 | 451.8[e1] | 444.2[e2] | 161.5 | 1.3[f] |
| B | 230.9 | 227.7 | 451.8 | 444.3 | 161.7 | 3.8 |
| Small Cation Compounds | | | | | | |
| Cu$_{3.2}$Mo$_6$S$_8$      A | 230.7 | 227.4 | 951.5[g1] | — | 161.8 | 4.6[h] |
| B | 230.9 | 227.7 | 951.6 | — | 161.9 | 8.4 |
| Fe$_{1.5}$Mo$_6$S$_8$      A | 230.8 | 227.6 | — | 710.1[g2] | 161.7 | 0.8[i] |
| B | 231.0 | 227.7 | — | 710.1 | 162.1 | —[j] |
| Ni$_{1.6}$Mo$_6$S$_8$      A | 230.5 | 227.3 | — | 852.5[g2] | 161.5 | 9.4[i] |
| B | 231.1 | 227.8 | — | 852.5 | 161.4 | 28 |
| Co$_{1.6}$Mo$_6$S$_8$      A | 231.2 | 227.8 | 796.2[g1] | 780.4[g2] | 161.9 | —[j] |
| B | 231.8 | 228.8 | 796.2 | 780.4 | 161.9 | — |
| | 229.9 | 227.8 | | | | |
| Co$_{1.7}$Mo$_6$S$_8$      A | 230.6 | 227.3 | 795.1[g1] | 779.4[g2] | 161.8 | 3.4[i] |
| B | 231.9 | 228.7 | 796.6 | 780.8 | 162.2 | 4.4 |

A = fresh catalyst
B = after 10 hr continuous H$_2$—thiophene reaction
[a]raw area ratio of Mo 3d electrons to ternary component M electrons
[b]Ho spectrum too diffuse to detect
[c]M 4f $\frac{5}{2}$ (c1) and 4f $\frac{7}{2}$ (c2)
[d]raw area ratio of Mo 3d to M 4f
[e]M 3d $\frac{3}{2}$ (e1) and 3d $\frac{5}{2}$ (e2)
[f]raw area ratio of M 3d to M 3d
[g]M 2p $\frac{1}{2}$ (g1) and 2p $\frac{3}{2}$ (g2)
[h]raw area ratio of Mo 3d to M 2p $\frac{1}{2}$
[i]raw area ratio of Mo 3d to M 2p $\frac{3}{2}$
[j]information not available The embodiments of the invention in which an exclusive property or privilege is claimed are defined as follows:

1. A hydrodesulfurization process comprising, contacting a sulfur-containing gaseous hydrocarbon with a chevrel phase compound of the general formula: $M_xMo_6S_8$ at a concentration and for a time sufficient to selectively reduce the sulfur content of the hydrocarbon, wherein M is selected from large and intermediate cations for chevrel phase compounds and M and x are selected to maintain the oxidation state of most of the Mo to less than $+4$.

2. The hydrodesulfurization process of claim 1, wherein the reaction is conducted at an elevated temperature.

3. The hydrodesulfurization process of claim 2, wherein the temperature is about 400° C.

4. The hydrodesulfurization process of claim 1, wherein the sulfur containing compounds include thiophene, Mercaptans disulfides and condensed thiophenes.

5. The hydrodesulfurization process of claim 1, wherein M is selected from the group consisting of Ho, Pb, Sn, Ag and In.

6. The hydrodesulfurization process of claim 1, wherein M is selected from the group consisting of Ho, Pb and Sn.

7. The hydrodesulfurization process of claim 1, wherein the oxidation state of Mo in the chevrel phase compound is maintained in the range of from $+2$ to $+2\frac{2}{3}$.

8. A hydrodesulfurization process comprising, contacting a sulfur-containing gaseous hydrocarbon in the presence of hydrogen with a Chevrel phase compound of the general formula: $M_xMo_6Z_8$ at an elevated temperature for a time sufficient to reduce the sulfur content of the hydrocarbon while maintaining hydrogenation reactions at a relatively low level, wherein M is selected from large and intermediate cations for chevrel phase compounds and Z is selected from the group consisting of sulfur, selenium and tellurium.

9. The hydrodesulfurization process of claim 8, wherein the oxidation state of Mo in the chevrel phase compounds is less than $+3$.

10. The hydrodesulfurization process of claim 9, wherein the sulfur-containing gaseous hydrocarbon is contacted with the chevrel phase compounds intermittently.

11. The hydrodesulfurization process of claim 8, wherein the desulfurization takes place in the absence of oxygen.

12. The hydrodesulfurization process of claim 8, wherein the desulfurization takes place at atmospheric pressure at a temperature of about 400° C.

13. The hydrodesulfurization process of claim 8, wherein M is selected from the group consisting of Ho, Pb, Sn, Ag and In.

14. The hydrodesulfurization process of claim 8, wherein M is selected from the group consisting of Ho, Pb and Sn.

15. The hydrodesulfurization process of claim 14, wherein Z is sulfur.

16. The hydrodesulfurization process of claim 8, wherein the oxidation state of Mo in the chevrel phase compounds is less than $+3$.

17. The hydrodesulfurization process of claim 8, wherein the sulfur-containing gaseous hydrocarbon is contacted with the chevrel phase compounds intermittently.

* * * * *